June 24, 1958        J. G. WEEKS        2,840,780
METHODS OF AND APPARATUS FOR DYNAMICALLY GAGING RELAYS
Filed June 26, 1956
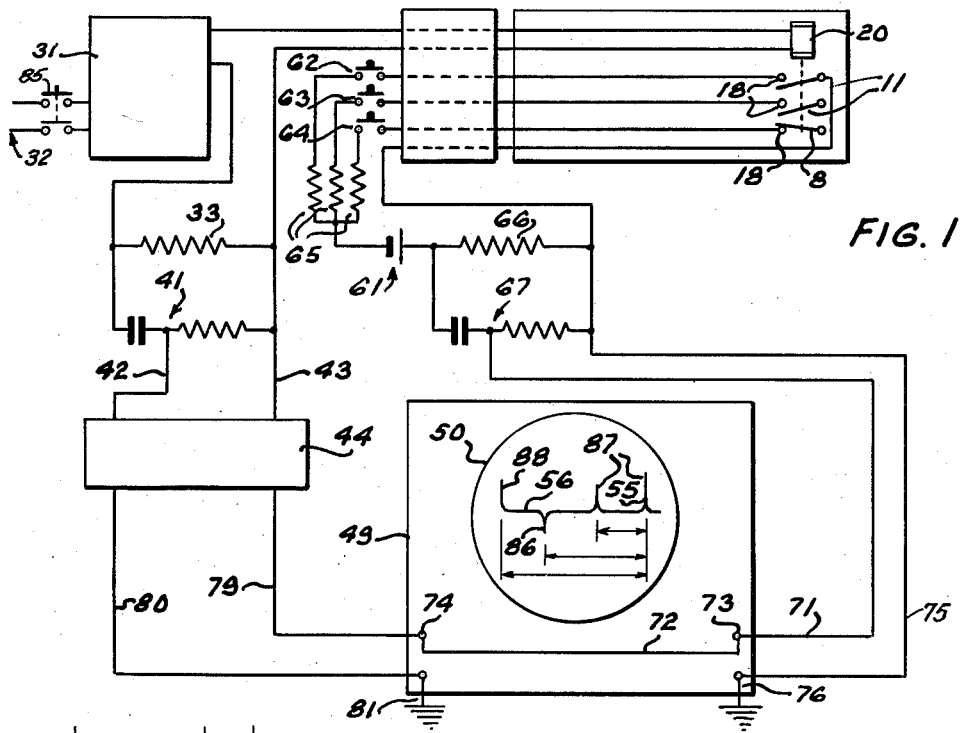
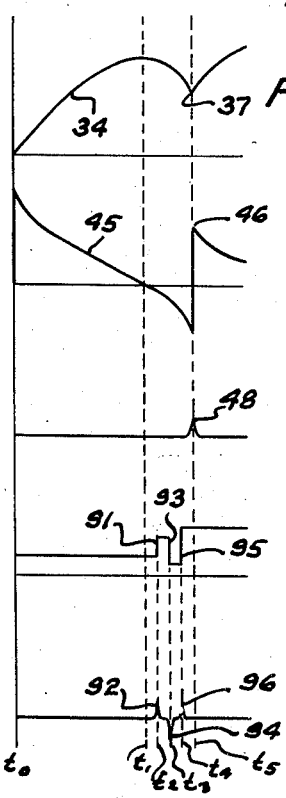
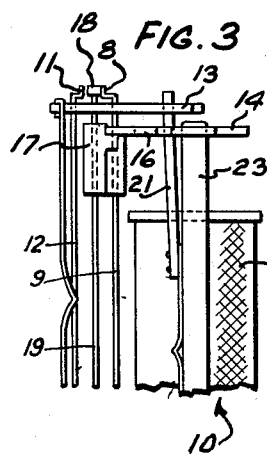
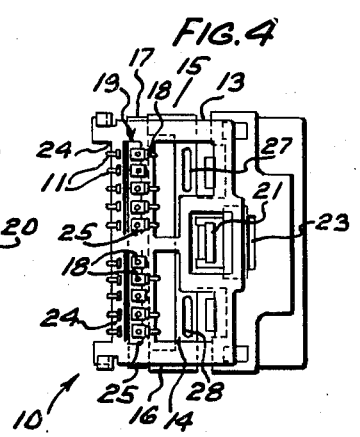
INVENTOR
J. G. WEEKS
BY C. B. Hamilton
ATTORNEY ional application of the invention may be used to test intermediate contacts 11 and 18 either or simultaneously with the test of the end contacts 11 and 18. Also, operation and position of any number of the break contacts 8 relative to the contacts 18 may be tested either with the test of the make contacts 11 or separately.

United States Patent Office 2,840,780
Patented June 24, 1958

2,840,780

METHODS OF AND APPARATUS FOR DYNAMICALLY GAGING RELAYS

John G. Weeks, Downers Grove, Ill., assignor to Western Electric Company, Incorporated, New York, N. Y., a corporation of New York Application June 26, 1956, Serial No. 593,840

11 Claims. (Cl. 324—28)

This invention relates to methods of and apparatus for dynamically gaging relays, and more particularly to methods of and apparatus for dynamically gaging wire spring relays.

In the manufacture of wire spring relays for use in telephonic or other electrical apparatus, it sometimes is necessary to adjust the biased position of the movable relay spring to provide the proper timing of the operation of contacts thereof relative to the final position of armatures of the relays. It also is necessary to have the contacts precisely positioned relative to the total armature travel. Apparatus has been provided in the past for testing relay contact operation, such as the methods and apparatus disclosed and claimed in copending applications Serial Nos. 357,875, 357,876 and 357,877 filed May 27, 1953, by R. W. Brown for "Apparatus for Testing Contacts," now Patent Nos. 2,805,388, 2,805,389 and 2,785,375, respectively. However, it is desirable to test relays without loading from transducers or the like, which are present in the apparatus disclosed in these applications, and no simple, reliable methods or apparatus have been disclosed in the past which will test relays without artificial loading and for precise relay-locating devices.

An object of the invention is to provide new and improved methods of and apparatus for testing relays dynamically.

Another object of the invention is to provide methods of and apparatus for testing relays dynamically without artificial loading of the relays.

A further object of the invention is to provide methods of and apparatus for testing relays in which the relays are operated and are gaged without artificial loads placed on the relays.

In a method and an apparatus illustrating certain features of the invention, a relay to be tested is operated and the period of time between the operation of contacts of the relay and the point at which armature travel of the relay is stopped is measured by measuring the interval of time between the operation of the contact and the point thereafter at which the relay coil current rises sharply, which point is coincident with the point at which the armature is mechanically stopped.

In a method and apparatus illustrating the invention more specifically, a wire spring relay is energized to move a comb by an armature relative to a fixed comb, and the current of the relay coil is measured to determine, by a sharp rise thereof, the point at which the armature is stopped from further travel. Also, prior to this point, the condition of the contacts change, and this latter point of time is ascertained. The time between these two occurrences may be measured on an oscilloscope, or the like. The two end sets of contacts of the relays are measured alternately, and the contacts are adjusted in accordance with the measurements of the sets of contacts.

A complete understanding of the invention may be obtained from the following detailed description of a method and apparatus forming specific embodiments thereof, when read in conjunction with the appended drawings, in which Fig. 1 is a diagrammatic view of an apparatus for practicing a method forming one embodiment of the invention;

Fig. 2 is a series of charts illustrating characteristics of the apparatus shown in Fig. 1, Fig. 3 is an end view of a relay tested by the apparatus shown in Fig. 1, and Fig. 4 is a fragmentary side view of the relay.

Referring now in detail to the drawings, there is shown an apparatus for testing a wire spring relay 10 to determine whether or not contacts 11 of a movable comb 12 are operated properly by a card 13 and whether the positions of the contacts 11 are proper relative to contacts 18 of a fixed center comb 19. The apparatus also tests position and operation of break contacts 8 of a comb 9 also operated by the card 13. This operation is determined by a stop plate or locater 14 having arms 15 and 16 against which ends of a molded block 17 of the center comb 19 always bears. When a coil 20 of the relay is operated and energized, an armature 21 moves the card 13 in a direction such that bars 24 and 25 of the card 13 move the contacts 8 and 11 relative to the contacts 18. The armature 21 moves the card 13 until the armature is stopped by engagement with a stationary core 23 of the relay. By measuring the time between which the upper end contact 11, as viewed in Fig. 4, strikes its end contact 18 and the point at which the armature engages the core 23, and simultaneously measuring the time between the change of condition of the lowermost contact 11 and the lowermost contact 18 and the point at which the armature 21 engages the core 23, whether or not the comb 19 is spaced properly by the locater 14 to provide optimum operation and spacing of the contacts 11 and 18 may be determined. Also, whether or not the comb 19 is in a position in which the line formed by the contacts 11 is canted relative to the line formed by the contacts 18 may be determined, and, if necessary, the arms 15 and 16 of the locater 14 may be adjusted by inserting a screwdriver into slots 27 and 28 in the locater 14 and twisting the screwdrivers to position the comb 19 precisely. The circuit also may be used to test intermediate contacts 11 and 18 either or simultaneously with the test of the end contacts 11 and 18. Also, operation and position of any number of the break contacts 8 relative to the contacts 18 may be tested either with the test of the make contacts 11 or separately.

The relay coil 20 is energized periodically by a pulsing circuit 31 supplied with power from a direct current powerline 32, and as the current builds up in the relay coil, the voltage across a resistor 33 in series with the coil 20 follows a curve 34, which corresponds to the current through the relay coil as it is operated. The current rises at substantially one rate until the inertia of the armature is overcome, and then the rate of rise decreases until the armature 21 strikes the core 23, at which time the current, from a point 37 on the curve 34, rises at a much higher rate. A differentiating network 41 is provided to differentiate the coil current, and the voltage across conductors 42 and 43 lead into a pulse-forming circuit 44 of a well known type as a voltage curve 45 which increases instantaneously in a pulse 46 coincident in time with the occurrence of the point 37 on the curve 34. The pulse 46 is fed to the pulse-forming circuit 44, which forms an output pulse 48 which is transmitted to an oscilloscope 49 having a screen 50. The oscilloscope is of a well known type having a triggerable horizontal sweep circuit and a vertical deflection circuit. This pulse 48 causes a pip 55 to be formed on the screen 50, which indicates the end of the travel of the aramture.

A battery 61 supplies power parallelly to the contacts 8 and 11 through selectively operable manual switches 62, 63 and 64 and resistors 65 and 66, and a differentiating network 67 is connected across the resistor 66. Each of the resistors 65 is of a different resistance from that of the other resistors 65. Conductors 71 and 72 connect one side of the network 67 to a sweep-triggering terminal 73 of the oscilloscope and a vertical deflection terminal 74 of the oscilloscope, and a conductor 75 connects the other side of the network 67 to a ground terminal 76 of the oscilloscope. A conductor 79 connects one side of the pulse-shaping circuit 44 to the terminal 74 and the conductor 72, and a conductor 80 connects the other side of the circuit 44 to a ground terminal 81.

With all three switches 62, 63 and 64 closed, a manually operable switch 85 is closed and the circuit 31 periodically energizes and deenergizes the relay coil or winding 20. During each energization of the relay coil 20, the voltage across the resistor 33 follows the curve 34 and creates the pulse 46, which occurs as the armature 21 strikes the core 23. Prior to the occurrence of the pulse 46, the contacts 8, 11 and 18 operate. On the operation of the first contacts, the horizontal sweep circuit of the oscilloscope is triggered. The operation of the first contacts to operate causes a voltage change 91 across resistor 66. The change 91 is differentiated by the network to form a voltage pulse 92 which triggers the horizontal sweep and causes vertical pip 88 to occur. Also, break contacts 8 and 18, which are connected to the switch 64, open to reduce the voltage across resistor 66 to cause a voltage change 93 and differentiated pulses 94 to form a pip 86, and make contacts 11 and 18 connected to the switch 62 close to cause voltage change 95 across resistor 66 which is differentiated to form pulse 96 which actuates the oscilloscope to form a pip 87. Thus, the sweep of the beam is started simultaneously with the first contact operation, either one of the pairs of make contacts 11 and 18 or one of the pairs of the break contacts 8 and 18. The resistor 33 and the magnitude of the voltage from pulsing circuit 31 are so proportioned as to cause the current in the relay coil 20 to rise much more rapidly than normal, thereby causing the relay armature to accelerate faster than normal so that the armature speed during the period that the contacts 8, 11 and 18 operate within is substantially constant. This permits the scale of the oscilloscope screen to be linear. The screen 50 is graduated hoizontally in thousandths of an inch of travel of the card 13 in accordance with the rate of travel of the armature or card during the period of operation of the contacts so that the distances between the end of the card or armature travel and the several contact operations may be read directly. Also, the rate of travel of the armature is known and is substantially uniform during the portion of its movement in which the contacts are operated, these distances can be converted into time and the characteristics of the relay operation and contact position determined.

If it is desired to measure only one set of contacts 11 and 18 or 8 and 18, only the one of the switches 62, 63 or 64 to these contacts is closed and the apparatus is operated. Then the distance between the left hand end of the trace 56 and the pip 55 indicate the difference between the operation of the contacts and the end of the travel of the armature 21. By gaging an end set of contacts 11 and 18 and then measuring the set of contacts 11 and 18 at the other end of the relay, the position of the comb 19 may be determined and adjusted accordingly. Or, if desired both of these sets of contacts may be connected to two of the switches 62, 63 and 64, these two switches closed and the locater 14 adjusted, if necessary, to make the start of the trace 56. If the sets of contacts are both of the same type, the locater 14 is adjusted, if necessary, until no pip other than the pip 55 is present. If the two sets are of different types, the locater is adjusted, if necessary, to form one pip and the start of the trace the desired distance apart.

Also, in accordance with the invention, the period of time between the operating of one set of contacts and the point at which the armature travel stops may be determined by using a pulse created by the change in condition of the set of contacts to start an electronic timer and the pulse created by the change in coil current of the relay coil as the armature travel stops to stop the counter, as disclosed in my copending application Serial No. 593,880, filed simultaneously herewith for "Apparatus for Gaging and Adjusting Relays."

The above-described methods and apparatus quickly and precisely measure operating time of relays, and do so while the relays are under no artificial load.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. The method of gaging relays comprising applying an energizing voltage across a coil of a relay to cause the relay to move an armature so as to sequentially operate a set of contacts of the relay and move into engagement with a stop of the relay, creating an electrical pulse from the operation of the set of contacts, creating an electrical pulse from the change in coil current as the armature strikes the stop, and measuring the time between the pulses.

2. The method of gaging relays comprising applying a high energizing voltage through a resistance circuit to a coil of a relay to cause the relay to move an armature at a substantially constant velocity whereby the armature sequentially operates a set of contacts of the relay and moves into engagement with a stop of the relay, creating an electrical pulse from the operation of the set of contacts, creating an electrical pulse from the change in coil current as the armature strikes the stop, and measuring the period of time between the pulses.

3. The method of gaging relays comprising energizing a wire spring relay coil to move an armature from a retracted position to a contact-operating position against a stop, whereby contacts of a movable wire spring relay comb are moved operatively relative to a stationary wire spring relay comb, forming a time indication from a pulse formed by a set of the contacts as it is actuated, and forming a second time indication from a pulse created in the coil as the armature engages the stop.

4. The method of gaging a wire spring relay having an operating coil, a stationary comb having a row of contacts, a movable comb having a row of contacts, armature means movable from a retracted position for actuating the contacts of the movable comb, a coil for actuating the armature means, means for twisting the armature means in its retracted position and a core for stopping travel of the armature means, which comprises applying an energizing voltage across the coil, whereby the armature means sequentially changes the conditions of contacts of the combs and engages the core, creating a pulse as a pair of contacts at one end of the combs change condition, forming a pulse from current increase in the coil as the armature is stopped by the core, and measuring the period of time between the pulses.

5. The method of gaging and adjusting a wire spring relay having an operating coil, a stationary comb having a row of contacts, a movable comb having a row of contacts, armature means movable from a retracted position for actuating the contacts of the movable comb, a coil for actuating the armature means, means for twisting the armature means in its retracted position and a core for stopping travel of the armature means, which comprises applying an energizing voltage across the coil, whereby the armature sequentially changes the conditions of contacts of the combs and engages the core, creating a pulse as a pair of contacts at one end of the combs change condition, forming a pulse from current increase in the coil as the armature is stopped by the core, measuring the period of time between the pulses, again applying an energizing voltage across the core, creating a pulse as a pair of contacts at the other end of the combs change condition, forming a pulse as the armature is stopped by the core, measuring the period of time between the two last-mentioned periods of time, and adjusting the twisting means in accordance with a comparison of the periods of time.

6. The method of gaging a relay comprising applying an energizing voltage across a coil of a relay and a resistor in series therewith to sequentially operate a plurality of sets of contacts of the relay through an armature thereof and move the armature into engagement with a core of the relay, connecting the sets of contacts in parallel with one another and in series with a fixed voltage source and a second resistor, differentiating pulses formed across the second resistor, applying the differentiated pulses to an oscilloscope to form pips on a screen of the oscilloscope, differentiating the voltage across the first resistor, and applying a pulse formed by the last-mentioned step as the armature engages the core to the oscilloscope to form a pip on the screen spaced after the first-mentioned pips.

7. An apparatus for dynamically testing relays comprising pulse-operable time interval measuring means, means for energizing a relay coil to move an armature of a relay to operate contacts of the relay and then strike a stop of the relay, means operable by change of condition of the contacts for pulsing the time interval measuring means, and means operable by a sharp increase in current in the coil as the armature engages the stop for pulsing the time interval measuring means.

8. An apparatus for dynamically testing relays comprising means for energizing a coil of a relay to actuate an armature thereof to sequentially change condition of contacts of the relay and engage a stop thereof, whereby a sharp rise in coil current occurs, means for measuring time between pulses applied thereto, means for applying a pulse to the time-measuring means coincident with change of condition of the contacts, and means responsive to the sharp rise in coil current for applying a second pulse to the time-measuring means.

9. An apparatus for dynamically testing relays comprising an oscilloscope having a triggerable horizontal sweep circuit and vertical deflector circuit, means for pulsing a coil of a relay to move an armature of the relay so as to sequentially change conditions of a pair of contacts thereof and move against a stop of the relay, whereby a surge of current in the relay coil occurs, said pulsing circuit including a resistor in series with the coil, a second resistor connected across the pair of relay contacts, means for applying the voltage across the second resistor to the vertical deflection circuit, and means for triggering the horizontal sweep circuit no later than the change of condition of the pair of contacts.

10. An apparatus for dynamically testing relays comprising an oscilloscope having a triggerable horizontal sweep circuit and vertical deflector circuit, means for periodically pulsing a coil of a relay to periodically move an armature of the relay so as to sequentially change conditions of a plurality of pairs of contacts thereof and move against a stop of the relay, whereby a surge of current in the relay coil occurs, said pulsing circuit including a resistor in series with the coil, individual circuits for applying different voltages to the individual pairs of contacts including a second resistor, means for applying the voltage across the second resistor to the vertical deflection circuit, and means for triggering the horizontal sweep circuit no later than the change of condition of the first pair of contacts to operate.

11. An apparatus for dynamically testing relays comprising an oscilloscope having a triggerable horizontal sweep circuit and vertical deflector circuit, low time constant means for periodically pulsing a coil of a relay to periodically move an armature of the relay so as to sequentially change conditions of a pair of contacts thereof and move against a stop of the relay, whereby a surge of current in the relay coil occurs, said pulsing circuit including a resistor in series with the coil, a second resistor connected across said pair of relay contacts, means for applying the voltage across the second resistor to the vertical deflection circuit, and means for triggering the horizontal sweep circuit no later than the change of condition of the pair of contacts.

References Cited in the file of this patent

UNITED STATES PATENTS

| | | |
|---|---|---|
| 2,154,379 | Estes | Apr. 11, 1939 |
| 2,212,634 | Buckingham | Aug. 27, 1940 |